United States Patent
Peng et al.

(10) Patent No.: US 10,992,574 B2
(45) Date of Patent: Apr. 27, 2021

(54) PACKET FORWARDING METHOD AND DEVICE

(71) Applicant: ZTE CORPORATION, Shenzhen (CN)

(72) Inventors: Shaofu Peng, Shenzhen (CN); Huilai Wang, Shenzhen (CN); Jinsong Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 215 days.

(21) Appl. No.: 16/320,895

(22) PCT Filed: Jun. 20, 2017

(86) PCT No.: PCT/CN2017/089179
§ 371 (c)(1),
(2) Date: Jan. 25, 2019

(87) PCT Pub. No.: WO2018/019054
PCT Pub. Date: Feb. 1, 2018

(65) Prior Publication Data
US 2019/0166045 A1 May 30, 2019

(30) Foreign Application Priority Data
Jul. 27, 2016 (CN) .......................... 201610601852.5

(51) Int. Cl.
*H04L 12/723* (2013.01)
*H04L 12/753* (2013.01)
(Continued)

(52) U.S. Cl.
CPC ............ *H04L 45/507* (2013.01); *H04L 45/02* (2013.01); *H04L 45/122* (2013.01);
(Continued)

(58) Field of Classification Search
USPC .......................................................... 709/238
See application file for complete search history.

(56) References Cited

U.S. PATENT DOCUMENTS

2013/0077476 A1* 3/2013 Enyedi .................... H04L 45/48
370/225
2015/0207671 A1 7/2015 Farkas et al.
(Continued)

FOREIGN PATENT DOCUMENTS

CN 105450437 A 3/2016
CN 105637807 A 6/2016

OTHER PUBLICATIONS

Atlas et al., "An Architecture for IP/LDP Fast Reroute Using Maximally Redundant Trees (MRT-FRR)" Internet Engineering Task Force (IETF), Jun. 2016. 44 pages.
(Continued)

*Primary Examiner* — Hermon Asres
(74) *Attorney, Agent, or Firm* — Li & Cai Intellectual Property (USA) Office

(57) ABSTRACT

The present invention provides a packet forwarding method and device. The method comprises: a first node receiving a packet for forwarding, wherein a destination address of the packet is a second node; the first node identifying, from topologies generated in advance, a target topology corresponding to the packet, wherein the topologies generated in advance comprise a first topology and a second topology generated according to an MRT algorithm, and a third topology obtained according to an SPF algorithm, wherein the first topology, the second topology and the third topology are different from one another; and the first node identifying, from the target topology, a next hop node for forwarding to the second node, and forwarding the packet to the next hop
(Continued)

node. The present invention achieves an object of combining a segmented routing network and an MRT function.

15 Claims, 5 Drawing Sheets

(51) Int. Cl.
*H04L 12/707* (2013.01)
*H04L 12/735* (2013.01)
*H04L 12/703* (2013.01)
*H04L 12/721* (2013.01)
*H04L 12/751* (2013.01)
*H04L 12/733* (2013.01)
*H04L 12/741* (2013.01)

(52) U.S. Cl.
CPC ............ *H04L 45/128* (2013.01); *H04L 45/22* (2013.01); *H04L 45/28* (2013.01); *H04L 45/34* (2013.01); *H04L 45/48* (2013.01); *H04L 45/50* (2013.01); *H04L 45/745* (2013.01)

(56) References Cited

U.S. PATENT DOCUMENTS

2015/0350062 A1   12/2015  Lindem, III et al.
2017/0346718 A1*  11/2017  Psenak .................... H04L 45/02

OTHER PUBLICATIONS

International Search Report; International Application No. EP17833358.9; International Filing Date: Jun. 20, 2017; dated Jun. 6, 2019; 15 pages.

Li et al., "Multi-Topology (MT) Segment in Segment Routing" Network Working Group, Mar. 9, 2015. 5 pages.

\* cited by examiner

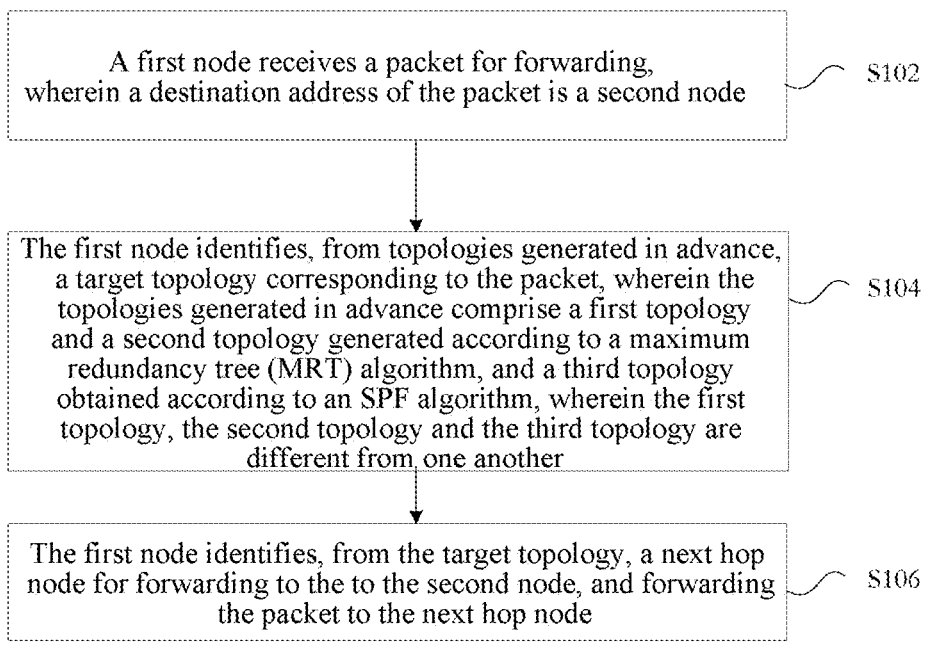

Fig.1

| MRT Algorithm | MRT Lowpoint algorithm |
|---|---|
| MRT-Red MT-ID | allocated from Multi-Topolopy Identifiers Registry, to be allocated by IANA |
| MRT-Blue MT-ID | allocated from Multi-Topolopy Identifiers Registry, to be allocated by IANA |
| GADAG Root Selection Policy | selecting the minimum based on GADAG Root Selection Priority which is advised by each router |
| MRT Forwarding Mechanism | MRT SR-LSP based on multi-SRGB non-tunneling Option |
| Recalculation | Waiting for the SPT convergence result after switching and all routers switch traffic back to SPT before starting to calculate the new MRT |
| Area/Level Border | Behavior ABR/LBR should ensure that traffic leaving the area also leaves the MRT-Red or MRT-Blue forwarding topology |

Fig.2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Length    |            MT-ID              |
+-+-+-+-+-+-+-+-+-+-+-+-+-+-+-+-+-+-+-+-+-+-+-+-+-+-+-+-+-+-+-+-+
|     Flag      |                   Range                       |
+-+-+-+-+-+-+-+-+-+-+-+-+-+-+-+-+-+-+-+-+-+-+-+-+-+-+-+-+-+-+-+-+
|                      SID/Label sub-TLV                        |
+-+-+-+-+-+-+-+-+-+-+-+-+-+-+-+-+-+-+-+-+-+-+-+-+-+-+-+-+-+-+-+-+
```

Fig.3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Type                |            Length             |
+-+-+-+-+-+-+-+-+-+-+-+-+-+-+-+-+-+-+-+-+-+-+-+-+-+-+-+-+-+-+-+-+
|               |                    Reserved                   |
+-+-+-+-+-+-+-+-+-+-+-+-+-+-+-+-+-+-+-+-+-+-+-+-+-+-+-+-+-+-+-+-+
|          Range Size           |              Flag             |
+-+-+-+-+-+-+-+-+-+-+-+-+-+-+-+-+-+-+-+-+-+-+-+-+-+-+-+-+-+-+-+-+
|                      SID/Label sub-TLV                        |
+-+-+-+-+-+-+-+-+-+-+-+-+-+-+-+-+-+-+-+-+-+-+-+-+-+-+-+-+-+-+-+-+
```

Fig.4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |     Flag      |  Algorithm    |
+-+-+-+-+-+-+-+-+-+-+-+-+-+-+-+-+-+-+-+-+-+-+-+-+-+-+-+-+-+-+-+-+
|                    SID/Index/Label (variable)                 |
+-+-+-+-+-+-+-+-+-+-+-+-+-+-+-+-+-+-+-+-+-+-+-+-+-+-+-+-+-+-+-+-+
```

Fig.5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        Type           |              Length                   |
+-+-+-+-+-+-+-+-+-+-+-+-+-+-+-+-+-+-+-+-+-+-+-+-+-+-+-+-+-+-+-+-+
|   Flag    |  Reserved |     MT-ID     |        Algorithm      |
+-+-+-+-+-+-+-+-+-+-+-+-+-+-+-+-+-+-+-+-+-+-+-+-+-+-+-+-+-+-+-+-+
|                   SID/Index/Label (variable)                  |
+-+-+-+-+-+-+-+-+-+-+-+-+-+-+-+-+-+-+-+-+-+-+-+-+-+-+-+-+-+-+-+-+
```

PACKET FORWARDING METHOD AND DEVICE

CROSS REFERENCE

The present application is a continuing application of International Application No. PCT/CN2017/089179, filed on Jun. 20, 2017, which is based upon and claims priority to Chinese Patent Application No. 201610601852.5, filed on Jul. 27, 2016, and the entire contents thereof are incorporated herein by reference.

TECHNICAL FIELD

The present disclosure relates to the technical field of communication, and in particular, to a packet forwarding method and device.

BACKGROUND

Fast Re-Route (FRR) based on Maximum Redundant Trees (MRT) is a latest FRR technology that uses two forwarding topologies different from each other as much as possible, which can provide 100% protection against failure on a single-node link or a node. The MRT architecture defines two forwarding mechanisms, i.e., a Label Distribution Protocol (LDP) forwarding mechanism and a network protocol-tunnel (IP-tunnel) forwarding mechanism. The LDP forwarding mechanism distinguishes between the default topology forwarding behavior and the MRT forwarding behavior by different labels, so that the forwarding plane can support the MRT-FRR without any upgrade. The IP-tunnel forwarding mechanism has to consume a dedicated MRT loopback address to support forwarding. Nevertheless, it can also enable the forwarding plane to support MRT-FRR without any upgrade. In contrast, the LDP forwarding mechanism is more desirable. Therefore, the default MRT profile in the MRT architecture uses the LDP forwarding mechanism. Currently, no other MRT profiles have been defined.

With segmentation routing technology, a node can specify a forwarding path for a packet, rather than forwarding it through a shortest path. By adding information about a Segment List composed of Segment IDs to the packet, it can eliminate the need to maintain status information of each path on an intermediate node. Segmentation routing primarily extends the IGP to support advertising and learning segment IDs. Generally, in a network where the segmentation routing is deployed, the LDP and a Resource ReSerVation Protocol-Traffic Extension (RSVP-TE) are no longer needed. In the segmented routing network, the known FRR technology is Topology Independent Loop Free Alternate (TI-LFA), but the protection rules defined by the TI-LFA are rather complicated and immature.

The introduction of the MRT function in the segmented routing network will be of great significance. However, there has been no literature discussing this aspect so far. Therefore, in the related art, the segmented routing network cannot be combined with the MTR function.

SUMMARY

The embodiment of the present disclosure provides a method and a device for forwarding a packet, so as to solve at least the problem that the segmented routing network and the MTR function cannot be combined in the related art.

According to an embodiment of the present disclosure, there is provided a method for forwarding a packet, including: receiving, by a first node, a packet to be forwarded, wherein a destination address of the packet is a second node; searching, by the first node, for a target topology corresponding to the packet in previously generated topologies, wherein the previously generated topologies include: a first topology and a second topology generated according to a maximum redundancy tree MRT algorithm, and a third topology generated according to a Shortest Path First SPF algorithm, and the first topology, the second topology and the third topology are different from one another; and searching, by the first node, for a next hop node for forwarding to the second node in the target topology, and forwarding the packet to the next hop node according to a predetermined forwarding mechanism, wherein the predetermined forwarding mechanism is a segmentation route forwarding mechanism based on a global block SRGB in a non-tunnel nesting manner for each topology and each segment route.

For example, the method further includes: determining, by the first node, a protection route for protecting a route to the destination address in the third topology from a route to the destination address in the first topology and a route to the destination address in the second topology according to the MRT algorithm, and determining a topology corresponding to the protection route as a protection topology.

For example, searching, by the first node, for a target topology corresponding to the packet in previously generated topologies includes: deciding, by the first node, whether a failure occurs in a link to the second node in the third topology; when deciding that there is no failure, determining, by the first node, the third topology as the target topology; and/or, when deciding there is a failure, determining, by the first node, the protection topology as the target topology.

For example, before receiving, by the first node, the packet to be forwarded, the method further includes: generating, by the first node, the first topology and the second topology according to the MRT algorithm, and generating the third topology according to the SPF algorithm.

For example, generating, by the first node, the first topology and the second topology according to the MRT algorithm, and generating the third topology according to the SPF algorithm includes: determining, by the first node, a MRT Island where the first node is located, wherein the MRT Island is formed at the same area or the same level as the first node through negotiation between the first node and other node at the same area or the same level as the first node after the segmentation route SR and the MRT profile are enabled in an Open shortest Path First OSPF instance or an Intermediate system to Intermediate system ISIS instance on the first node and said other node; and generating, by the first node the first topology and the second topology according to the MRT algorithm running on the MRT Island, and generating the third topology according to the SPF algorithm running in the area or at the level.

For example, the predetermined forwarding mechanism is specified in the MRT profile.

For example, the method further includes at least one of: allocating, by the first node, a first segment route global block SRGB for the first topology, and flooding the first SRGB inside the area or the level where the MRT Island is located; allocating, by the first node, a second segment route global block SRGB for the second topology, and flooding the second SRGB inside the area or the level where the MRT Island is located; allocating, by the first node, a third segment route global block SRGB for the third topology, and flooding the third SRGB inside the area or the level where the first node is located; and receiving, by the first node, segment route global blocks SRGBs for the previously generated topologies on other node, recording the SRGBs for the previously generated topologies on said other node, and further advising the SRGBs for the previously generated topologies on said other node to a node other than said other node.

For example, forwarding, by the first node, the packet to the next hop node includes: determining, by the first node, an outgoing label of the first node; and packing, by the first node, the outgoing label of the first node to the packet, and sending the packed packet to the next hop node.

For example, determining, by the first node, the outgoing label of the first node includes: deciding, by the first node, whether the next hop node is a node outside the MRT Island where the first node is located; when the deciding result is negative, determining, by the first node, an outgoing label of the first node for the corresponding target topology, wherein the outgoing label of the first node for the corresponding target topology is calculated by the first node based on a prefix segment index prefix-sid of the second node for the third topology and the SRGB of the next hop node for the corresponding target topology; and/or, when the deciding result is positive, determining, by the first node, an outgoing label of the first node for the corresponding target topology, wherein the outgoing label of the first node for the corresponding target topology is calculated by the first node based on a prefix segment index prefix-sid of the second node for the third topology and the SRGB of the next hop node for the corresponding third topology.

For example, determining, by the first node, the outgoing label of the first node includes: deciding, by the first node, whether the next hop node is an Area Border Router ABR or a Level Border Router LBR that requires the packet to be returned to the third topology; when the deciding result is negative, determining, by the first node, an outgoing label of the first node for the corresponding target topology, wherein the outgoing label of the first node for the corresponding target topology is calculated by the first node based on a prefix segment index prefix-sid of the second node for the third topology and the SRGB of the next hop node for the corresponding target topology; and/or, when the deciding result is positive, determining, by the first node, an outgoing label of the first node for the corresponding target topology, wherein the outgoing label of the first node for the corresponding target topology is calculated by the first node based on a prefix segment index prefix-sid of the second node for the third topology and the SRGB of the next hop node for the corresponding third topology.

For example, deciding, by the first node, whether the next hop node is an Area Border Router ABR or a Level Border Router LBR that requires the packet to be returned to the third topology includes: deciding, by the first node, whether a prefix-sid corresponding to a destination prefix previously generated for the third topology, which was received from the next hop node, carries a predetermined flag, wherein the predetermined flag indicates that the destination prefix was revealed by the ABR or the LBR from outside the area or the level to the area or the level, and was marked with the predetermined flag by the ABR or the LBR, such that the packet to the destination prefix returns to the third topology after leaving the ABR or the LBR; when the deciding result is that the prefix-sid corresponding to the destination prefix previously generated for the third topology, which was received from the next hop node, carries the predetermined flag, and an advising node of the destination prefix in the third topology is the next hop node, determining that the next hop node is the ABR or the LBR that requires the packet to be returned to the third topology; and when the deciding result is that the prefix-sid corresponding to the destination prefix previously generated for the third topology, which was received from the next hop node, does not carry the predetermined flag, and the deciding result is that it carries the predetermined flag, but the advising node of the destination prefix in the third topology is not the next hop node, determining that the next hop node is not the ABR or the LBR that requires the packet to be returned to the third topology.

For example, when the first node is an ABR or an LBR, when the first node advises the destination prefix to a neighbor in an area or level different from the area or level of the next hop node on the shortest path to the destination prefix, the prefix-sid corresponding to the destination prefix will carry the predetermined flag, and when the first node advises the destination prefix to a neighbor in an area or level the same as the area or level of the next hop node on the shortest path to the destination prefix, the prefix-sid corresponding to the destination prefix will not carry the predetermined flag.

For example, determining, by the first node, an outgoing label of the first node includes that: when the first node and the second node are the same node, the next hop node determined by the first node based on the target topology is the first node, and the first node does not have the outgoing label.

For example, packing, by the first node, the outgoing label of the first node to the packet, and sending the packed packet to the next hop node includes at least one of: when the packet type of the packet is an Internet Protocol IP packet, pushing the outgoing label of the first node on the IP header of the IP packet; and when the packet type of the packet is a segment routing SR label packet, replacing a top label of a label stack of the SR label packet with the outgoing label of the first node.

For example, when the first node and the second node are the same node, the method further includes: when the packet type of the packet is an Internet Protocol IP packet, sending, by the first node, the packet to a control plane of the first node; and/or, when the packet type of the packet is a segment routing SR label packet, popping out, by the first node, the top label of the label stack of the SR label packet, and continuing forwarding based on the lower label of the label stack or the IP header lookup table of the packet.

According to an embodiment of the present disclosure, there is provided a device for forwarding a packet, and the device is applied to a first node, including: a receiving module configured to receive a packet to be forwarded, wherein a destination address of the packet is a second node; a search module configured to search for a target topology corresponding to the packet in previously generated topologies, wherein the previously generated topologies include: a first topology and a second topology generated according to a maximum redundancy tree MRT algorithm, and a third topology generated according to a Shortest Path First SPF algorithm, and the first topology, the second topology and the third topology are different from one another; and a forwarding module configured to search for a next hop node for forwarding to the second node in the target topology, and forward the packet to the next hop node according to a predetermined forwarding mechanism, wherein the predetermined forwarding mechanism is a segmentation route forwarding mechanism based on a global block SRGB in a non-tunnel nesting manner for each topology and each segment route.

According to another embodiment of the present disclosure, there is provided a computer storage medium storing program codes configured to perform the above steps.

Through the present disclosure, the MRT function is introduced in the segmented routing network, thereby achieving the objective of combining the segmented routing network with the MTR function.

BRIEF DESCRIPTION OF THE DRAWINGS

The drawings described herein are provided to provide a further understanding of the present disclosure and constitute a part of this application. The illustrative embodiments of the present disclosure and the description thereof are for explaining the present disclosure and are not intended to limit the present disclosure. In the drawing:

FIG. 1 is a flow chart of packet forwarding according to an embodiment of the present disclosure;

FIG. 2 is a schematic diagram of a MRT Profile option according to an embodiment of the present disclosure;

FIG. 3 is a format diagram of an ISIS MT SR-Capabilities Sub-TLV according to an embodiment of the present disclosure;

FIG. 4 is a format diagram of an OSPF MT SID/Label Range TLV according to an embodiment of the present disclosure;

FIG. 5 is a format diagram of an ISIS Prefix-SID Sub-TLV according to an embodiment of the present disclosure;

DETAILED DESCRIPTION

Figures 6, 7:
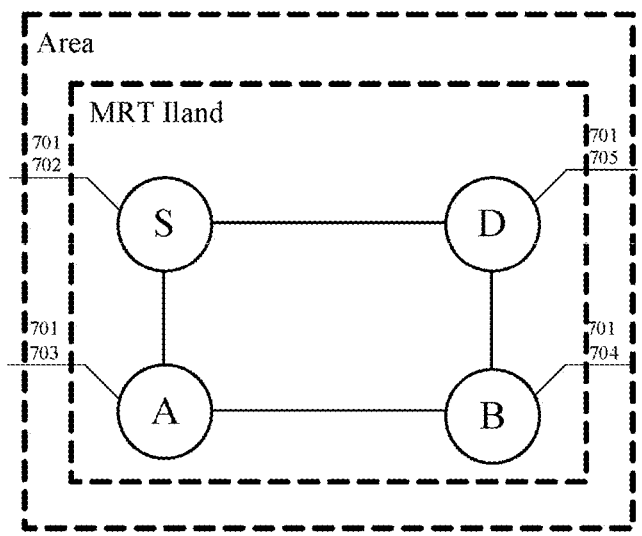
FIG. 6 is a format diagram of an OSPF Prefix SID Sub-TLV according to an embodiment of the present disclosure.
FIG. 7 is a network topology diagram according to a first embodiment of the present disclosure.

The present disclosure will be described in detail below with reference to the drawings in conjunction with the embodiments. It should be noted that the embodiments and the features in the embodiments in the present application may be combined with each other without conflict.

It should be noted that the terms "first", "second", and the like in the specification and claims of the present disclosure and the above drawings are used to distinguish similar objects, and are not necessarily used to describe a specific order or sequence.

In the embodiment, a method for forwarding a packet is provided. FIG. 1 is a flowchart of packet forwarding according to an embodiment of the present disclosure. As shown in FIG. 1, the process includes the following steps.

In step S102, a first node receives a packet to be forwarded, wherein a destination address of the packet is a second node.

In step S104, the first node searches for a target topology corresponding to the packet in previously generated topologies, wherein the previously generated topologies include: a first topology and a second topology generated according to a maximum redundancy tree (MRT) algorithm, and a third topology generated according to a Shortest Path First (SPF) algorithm, and the first topology, the second topology and the third topology are different from one another.

In step S106, the first node searches for a next hop node for forwarding to the second node in the target topology, and forwards the packet to the next hop node.

The first node may be any node inside the MRT Island, and the second node may be any node inside the SR Domain. The second node may be inside the MRT Island or outside the MRT Island. One of the first topology and the second topology may be a MRT-red topology, and the other may be a MRT-blue topology; and the third topology may be a MT-default topology.

In the above embodiment, when forwarding the packet to the next hop node, the first node may perform forwarding according to a predetermined forwarding mechanism which is a segmentation route forwarding mechanism based on a global block SRGB in a non-tunnel nesting manner for each topology and each segment route.

Through the above steps, the MRT function can be introduced into the segmented routing network, thereby achieving the objective of combining the segmented routing network with the MTR function.

In an exemplary embodiment, the method further includes: determining, a protection route for protecting a route to the destination address in the third topology from a route to the destination address in the first topology and a route to the destination address in the second topology according to the MRT algorithm, and determining a topology corresponding to the protection route as a protection topology. In the embodiment, in determining the protection route from the first node to the destination address (i.e., the second node), the route to the destination address in the first topology may be determined as the protection route, or the route to the destination address in the second topology may be determined as the protection route. In which topology the route to the destination address is determined as the protection route may be selected according to actual situation.

In an exemplary embodiment, the first node searching for a target topology corresponding to the packet in previously generated topologies includes: the first node deciding whether a failure occurs in a link to the second node in the third topology; when deciding that there is no failure, the first node determining the third topology as the target topology; and/or, when deciding there is a failure, the first node determining the protection topology as the target topology. In the embodiment, when there is no failure in the link, the packet can be forwarded according to the default topology; and when there is failure in the link, the packet can be forwarded according to the protection topology.

In an exemplary embodiment, before the first node receives the packet to be forwarded, the method further includes: the first node generating the first topology and the second topology according to the MRT algorithm, and generating the third topology according to the SPF algorithm.

In an exemplary embodiment, the first node generating the first topology and the second topology according to the MRT algorithm, and generating the third topology according to the SPF algorithm includes: the first node determining a MRT Island where the first node is located, wherein the MRT Island is formed at the same area or the same level as the first node through negotiation between the first node and other node at the same area or the same level as the first node after the segmentation route SR and the MRT profile are enabled in an Open shortest Path First (OSPF) instance or an Intermediate system to Intermediate system (ISIS) instance on the first node and said other node; the first node generating the first topology and the second topology according to the MRT algorithm running on the MRT Island, and generating the third topology according to the SPF algorithm running in the area or at the level.

In an exemplary embodiment, the MRT profile specifies the predetermined forwarding mechanism, i.e., the segmentation route forwarding mechanism based on a global block SRGB in a non-tunnel nesting manner for each topology and each segment route. In the embodiment, in the non-tunnel nesting manner, when a label is packed in the packet, the label directly indicates that the packet is forwarded to the second node.

In an exemplary embodiment, the method further includes at least one of the following: the first node allocating a first segment route global block SRGB for the first topology, and flooding the first SRGB inside the area or the level where the MRT Island is located; the first node allocating a second segment route global block SRGB for the second topology, and flooding the second SRGB inside the area or the level where the MRT Island is located; the first node allocating a third segment route global block SRGB for the third topology, and flooding the third SRGB inside the area or the level where the first node is located; the first node receiving segment route global blocks SRGBs for the previously generated topologies on other node, recording the SRGBs for the previously generated topologies on said other node, and further advising the SRGBs for the previously generated topologies on said other node to a node other than said other node. In the embodiment, each node may generate one SRGB for the first topology, one SRGB for the second topology, and one SRGB for the third topology respectively, and the SRGBs generated for different topologies are different, and the SRGBs generated by different nodes are independent from one another.

In an exemplary embodiment, the first node forwarding the packet to the next hop node includes: the first node determining an outgoing label of the first node; the first node packing the outgoing label of the first node to the packet, and sending the packed packet to the next hop node. In the embodiment, the label packing manners are different for different types of packets.

In an exemplary embodiment, the first node determining an outgoing label of the first node includes: the first node deciding whether the next hop node is a node outside the MRT Island where the first node is located; when the deciding result is negative, the first node determining an outgoing label of the first node for the corresponding target topology, wherein the outgoing label of the first node for the corresponding target topology is calculated by the first node based on a prefix segment index prefix-sid of the second node for the third topology and the SRGB of the next hop node for the corresponding target topology; and/or, when the deciding result is positive, the first node determining an outgoing label of the first node for the corresponding target topology, wherein the outgoing label of the first node for the corresponding target topology is calculated by the first node based on a prefix segment index prefix-sid of the second node for the third topology and the SRGB of the next hop node for the corresponding third topology.

In an exemplary embodiment, the first node the determining an outgoing label of the first node includes: the first node deciding whether the next hop node is an Area Border Router (ABR) or a Level Border Router (LBR) that requires the packet to be returned to the third topology; when the deciding result is negative, the first node determining an outgoing label of the first node for the corresponding target topology, wherein the outgoing label of the first node for the corresponding target topology is calculated by the first node based on a prefix segment index prefix-sid of the second node for the third topology and the SRGB of the next hop node for the corresponding target topology; and/or, when the deciding result is positive, the first node determining an outgoing label of the first node for the corresponding target topology, wherein the outgoing label of the first node for the corresponding target topology is calculated by the first node based on a prefix segment index prefix-sid of the second node for the third topology and the SRGB of the next hop node for the corresponding third topology.

In an exemplary embodiment, the first node deciding whether the next hop node is an ABR or a LBR that requires the packet to be returned to the third topology, includes: the first node deciding whether a prefix-sid corresponding to a destination prefix previously generated for the third topology, which was received from the next hop node, carries a predetermined flag, wherein the predetermined flag indicates that the destination prefix was revealed by the ABR or the LBR from outside the area or the level to the area or the level, and was marked with the predetermined flag by the ABR or the LBR, such that the packet to the destination prefix returns to the third topology after leaving the ABR or the LBR; when the deciding result is that the prefix-sid corresponding to the destination prefix previously generated for the third topology, which was received from the next hop node, carries the predetermined flag, and an advising node of the destination prefix in the third topology is the next hop node, determining that the next hop node is the ABR or the LBR that requires the packet to be returned to the third topology; and when the deciding result is that the prefix-sid corresponding to the destination prefix previously generated for the third topology, which was received from the next hop node, does not carry the predetermined flag, and the deciding result is that it carries the predetermined flag, but the advising node of the destination prefix in the third topology is not the next hop node, determining that the next hop node is not the ABR or the LBR that requires the packet to be returned to the third topology. In the embodiment, the predetermined flag is Rainbow, and may also be other flag.

In an exemplary embodiment, when the first node is an ABR or an LBR, when the first node advises the destination prefix to a neighbor in an area or level different from the area or level of the next hop node on the shortest path to the destination prefix, the prefix-sid corresponding to the destination prefix will carry the predetermined flag, and when the first node advises the destination prefix to a neighbor in an area or level the same as the area or level of the next hop node on the shortest path to the destination prefix, the prefix-sid corresponding to the destination prefix will not carry the predetermined flag.

In an exemplary embodiment, the first node determining the outgoing label of the first node includes that: when the first node and the second node are the same node, the next hop node determined by the first node based on the target topology is the first node, and thus the first node does not have the outgoing label. That is, if the first node is the second node, the next hop node determined by the first node based on the target topology is the first node itself, and in this case, the first node has no outgoing label.

In an exemplary embodiment, the first node packing the outgoing label of the first node into the packet includes at least one of the following: when the packet type of the packet is an Internet Protocol (IP) packet, pushing the outgoing label of the first node on the IP header of the IP packet; and when the packet type of the packet is a segment routing SR label packet, replacing a top label of a label stack of the SR label packet with the outgoing label of the first node.

In an exemplary embodiment, the method further includes: when the first node and the second node are the same node, the method includes: when the packet type of the packet is an Internet Protocol IP packet, the first node sending the packet to a control plane of the first node; and/or, when the packet type of the packet is a segment routing SR label packet, the first node popping out the top label of the label stack of the SR label packet, and continuing forwarding based on the lower label of the label stack or the IP header lookup table of the packet.

The present disclosure will be described below in conjunction with specific embodiments.

In an embodiment of the present disclosure, the segmentation routing is combined with the MRT technology to provide a MRT-FRR method based on the segmentation route forwarding mechanism. In an embodiment, a MRT profile is added to the MRT architecture, and the segmentation route forwarding mechanism is used to distinguish the default topology forwarding behavior and the MRT topology forwarding behavior.

The MRT-FRR method based on the segmentation route forwarding mechanism in the embodiment includes the following steps.

The first step, a new MRT profile is defined (as shown in FIG. 2). Compared with the default MRT Profile, the difference mainly lies in that the defined new MRT Profile employs a MRT SR-LSP based on multi-SRGB non-tunneling forwarding mechanism. SR-LSP is an LSP of a SR (Segment Routing) type generated based on the prefix-sid, similar to an LDP LSP. The MRT SR-LSP based on multi-SRGB non-tunneling forwarding mechanism means that the SR LSP in the MRT topology is established based on the destination prefix. That is, after the MRT FRR switchover occurs, on a MRT Ingress node, the SR LSP in the default topology is not tunnel nested, but is directly bonded in the SR LSP of the MRT topology, that is, the SR label corresponding to the default topology is switched to the SR label corresponding to the MRT topology. When the MRT SR-LSP based on multi-SRGB non-tunneling forwarding mechanism is adopted, the MRT ingress node does not need to sense the SR label corresponding to the default topology, which was assigned by a MRT Egress node for the destination prefix. Multi-SRGB refers to each SRGB is for each topology, that is, the SRGB for the default topology is different from the SRGB for the MRT-red topology or the MRT-blue topology.

In the second step, the MRT is enabled in the corresponding IGP instance on each node in the IGP area/level (which may be only a part of the node), the new MRT profile is supported, and the corresponding MRT Island is generated for the new MRT profile. Based on the MRT Island, MRT algorithm is run to generate the corresponding MRT-red and MRT-blue topologies, the corresponding MT-IDs are recorded as MT-red or MT-blue, respectively. In addition, the MT-ID corresponding to the default topology generated based on the SPF algorithm may be recorded as MT-default.

In the third step, the IGP instance on each node of the segment route is enabled. If the MRT is also enabled and the new MRT profile is supported, not only a MT-default_SRGB is allocated for the MT-default, but also a MT-red SRGB is allocated for the MT-red, and a MT-blue SRGB is allocated for the MT-blue. The MT-default_SRGB will flood in each area or level where the node is located, the MT-red SRGB and the MT-blue_SRGB will only flood in the area or level where the MRT Island is located. In addition, the corresponding prefix-sid can be assigned only for (MT-default, prefix) and flood with the (MT-default, prefix), and no corresponding prefix-sid is assigned for the (MT-red, prefix) and the (MT-blue, prefix) and flooded with the (MT-red, prefix) and the (MT-blue, prefix) respectively.

It should be noted that redundantly flooding the prefix-sids corresponding to the (MT-red, prefix) and the (MT-blue, prefix) will affect the network performance to a certain extent, and since it is MRT-related information, it can only be flooded in the area where the MRT Island is located. If the prefix is a prefix outside the area, the prefix does not sense the MT-red and MT-blue topologies on the original advising node, and thus no prefix-sid corresponding to the (MT-red, prefix) and the (MT-blue, prefix) will be assigned on the original advising node and flooded to the MRT-Island. Although a node in the MRT Island can be a proxy to be assigned with the prefix-sid corresponding to the (MT-red, prefix) and the (MT-blue, prefix) by other means such as the segmentation route mapping server SRMS, however, such means is not practically operable.

In the fourth step, a source node S inside the MRT Island calculates a SPF primary next hop and a MRT-blue/red next hop for the prefix inside the Island or outside the Island. That is, the (MT-default, prefix) will contain the SPF primary next hop, the (MT-blue, prefix) will contain the MRT-blue next hop, and the (MT-red, prefix) will contain the MRT-red next hop. It can be determined according to the MRT algorithm whether the MRT-blue next hop or the MRT-red next hop protects the SPF primary next hop.

The MT-default SR outgoing label in the SPF primary next hop is calculated based on the prefix-sid corresponding to the (MT-default, prefix) and the MT-default_SRGB of the next hop node. The MT-blue_SR outgoing label in the MRT-blue next hop is calculated based on the prefix-sid corresponding to the (MT-default, prefix) and the MT-blue_SRGB of the MRT-blue next hop node, in which the MT-red SR outgoing label in the MRT-red next hop is calculated based on the prefix-sid corresponding to the (MT-default, prefix) and the MT-red SRGB of the MRT-red next hop node.

A corresponding Forwarding Equivalence Class to NHLFE (FTN) entry is generated according to the (MT-default, prefix). A primary NHLFE contains the SPF primary next hop and the corresponding MT-default SR outgoing label. A MRT-FRR standby NHLFE contains the selected MRT-red next hop or MRT-blue next hop to protect the SPF primary next hop and the corresponding MRT-red SR outgoing label or MRT-blue_SR outgoing label. A corresponding ILM entry is also generated according to the (MT-default, prefix). A MT-default SR incoming label is calculated based a prefix-sid corresponding to the (MT-default, prefix) and the MT-default_SRGB of the S-node. The NHLFE and the FTN entries are the same. If the prefix is a local prefix or a directly connected prefix, there is no NHLFE information.

In the fifth step, the S-node further generates a corresponding Incoming Label Map (ILM) entry for the (MT-blue, prefix), in which the MT-blue_SR incoming label is calculated based on the prefix-sid corresponding to the (MT-default, prefix) and the MT-blue SRGB of the S node, and the NHLFE contains the MRT-blue next hop and the corresponding MT-blue_SR outgoing label. A corresponding ILM entry is also generated for the (MT-red, prefix), in which the MT-red SR incoming label is calculated based on the prefix-sid corresponding to the (MT-default, prefix) and the MT-red SRGB of the node S, and the NHLFE contains the MRT-red next hop and the corresponding MT-red SR outgoing label. If the prefix is a local prefix or a directly connected prefix, there is no NHLFE information.

There are two special scenarios which has to be taken into consideration in generating NHLFE of the corresponding ILM entries for the (MT-blue, prefix) and the (MT-red, prefix), as follows.

1) Calculating a MRT path to outside of the MRT Island using with a Named Proxy-node method.

The Named Proxy-node method can refer to RFC7812. For a prefix outside a certain MRT Island, if the node S is the proxy-node attachment router of the MRT Island, S will generate the corresponding FTN entry and ILM entry for the (MT-default, prefix). The NHLFE only contains the primary next hop in the MT-default topology and the corresponding MT-default SR outgoing label.

If the node S itself is the red proxy-node attachment router (that is, the node Y connecting the proxy-node in RFC7811), the node S will also generate an ILM entry corresponding to the (MT-red, prefix), in which the MT-red SR incoming label is calculated based on the prefix-sid corresponding to the (MT-default, prefix) and the MT-red SRGB of the S-node, and the next hop forwarding information contained in the NHLFE is not necessarily the shortest path forwarding information. If the node S is an IBR, the next hop in the NHLFE points to a specific LFIN (Loop-Free Island Neighbor, and the presence of the LFIN causes S to be selected as the proxy-node attachment router, which is not necessarily the next hop on the shortest path from S to prefix), and the corresponding MT-default SR outgoing label (calculated based on the prefix-sid corresponding the (MT-default, prefix) and the MT-default_SRGB of the LFIN node). If S is not an IBR, the next hop contained in the NHLFE points to an outgoing interface that causes S to advertise the prefix (the outgoing interface may leave the area/level/AS) and the corresponding MT-default SR outgoing label (calculated based on the prefix-sid corresponding the (MT-default, prefix) and the MT-default_SRGB of the node opposite to the outgoing interface).

It should be noted that, especially when the attachment router is an ABR, and both of the area2 where the destination prefix is located and the area1 where the node S is located support the same MRT profile, the NHLFE of the SR ILM entry generated for the (MT-red, prefix) or the (MT-blue, prefix) on the ABR node is still calculated based on the corresponding MT-red SRGB or MT-blue_SRGB. This is essentially a normal SR ILM entry establishment process inside the MRT Island in area2, irrelevant to area1. In this scenario, how the attachment router switches the traffic forwarded along the MRT path to the default topology can refer to the following "2) Cross-area forwarding behavior".

Similarly, if the node S itself is the blue proxy-node attachment router (that is, the node X connecting the proxy-node in RFC7811), the node S will also generate an ILM entry corresponding to the (MT-blue, prefix), which will not be described herein.

2) Cross-Area Forwarding Behavior

According to the description of the MRT architecture, for OSPF, the traffic with the destination address in the area should stay in the MRT-Red or MRT-Blue topology when being forwarded along the MRT-red or MRT-blue path. But for traffic leaving the area, it is expected to leave the MRT-Red or MRT-Blue topology and return to the default topology for shortest path forwarding. This is similar for the ISIS. In the embodiment, it follows the MRT architecture.

If S is used as an ABR node, the ABR will advertise the following prefix-sid for those IGP neighbors in the same area as the destination prefix:
    prefix-sid for (MT-default, prefix)

For those IGP neighbors that are not in the same area as the destination prefix, the ABR will advise the following prefix-sid:
    prefix-sid for (MT-default, prefix) with flag Rainbow After receiving the advised prefix-sid with flag Rainbow (corresponding to the above-mentioned predetermined flag) from the ABR, the neighbor node decides whether the prefix is a prefix outside the area and the MRT-blue next hop of the corresponding (MT-blue, prefix) is the advising node of the prefix (i.e., the ABR node). When the prefix is a prefix outside the area and the MRT-blue next hop of the corresponding (MT-blue, prefix) is the advising node of the prefix (i.e., the ABR node), it is considered that the MRT-blue_SR outgoing label of the (MT-blue, prefix) needs to be replaced with the MRT-default SR outgoing label, otherwise it needs not to be replaced. Similarly, when the neighbor node decides that the MRT-red next hop of the (MT-red, prefix) corresponding to the prefix is the ABR node, it is considered that the MRT-red SR outgoing label of the (MT-red, prefix) needs to be replaced with the MRT-default SR outgoing label, otherwise it needs not to be replaced. In this way, the packet across areas may follow the MRT topology before reaching the corresponding ABR, but after the ABR, the packet starts to follow the default topology.

In the sixth step, when a failure occurs, the IP or SR label unicast traffic may be forwarded along the MRT path as follows.

The MRT ingress node directs an IP packet based on a FTN entry corresponding to the (MT-default, prefix), or directs forwarding of a SR label packet based on an ILM entry, and for switching the traffic to the MRT backup path included in the NHLFE, such as MRT-red next hop, replaces the top label, MT-default SR incoming label, of the SR label packet with a MR-red SR outgoing label and then sends the SR label packet to the MRT-red next hop, or directly push the MR-red SR outgoing label on the IP packet and sends the IP packet to the MRT-red next hop.

The MRT transit node directs forwarding of a packet based on an ILM entry corresponding to the (MT-red, prefix), replaces the MT-red SR incoming label with a MR-red SR outgoing label and then sends the packet to the MRT-red next hop.

The MRT egress node directs forwarding of a packet based on an ILM entry corresponding to the (MT-red, prefix), replaces the MT-red SR incoming label with a MR-default SR outgoing label and then forwards the packet to the next hop specified in the NHLFE or pops off the MT-red SR incoming label and forwards the packet based on the IP head of the packet.

In a case where the MRT backup path on the MRT ingress node is the MRT-blue next hop, the progress is similar to the above, which will not be described herein.

The implementation of the technical solution will be further described in detail below with reference to the accompanying drawings:

In the embodiment, first, the MRT Profile and the SR TLV format introduced in this patent will be introduced.

FIG. 2 is a schematic diagram of a MRT profile option according to an embodiment of the present disclosure. The MRT profile shown in FIG. 2 is basically the same as the default MRT profile defined in RFC7812, except that the MRT Forwarding Mechanism option is SR-LSP based on multi-SRGB non-tunneling Option.

FIG. 3 is a format diagram of an ISIS MT SR-Capabilities Sub-TLV according to an embodiment of the present disclosure. The ISIS MT SR-Capabilities Sub-TLV format shown in FIG. 3 is basically the same as SR-Capabilities Sub-TLV given in draft-ietf-isis-segment-routing-extensions, except that a MT-ID field is added to support different SRGBs for different topologies.

FIG. 4 is a format diagram of an OSPF MT SID/Label Range TLV according to an embodiment of the present disclosure. The OSPF MT SID/Label Range TLV format shown in FIG. 4 is basically the same as the SID/Label Range TLV given in draft-ietf-ospf-segment-routing-extensions, except that a MT-ID field is added to support different SRGBs for different topologies.

FIG. 5 is a format diagram of an ISIS Prefix-SID Sub-TLV according to an embodiment of the present disclosure. The ISIS Prefix-SID Sub-TLV format shown in FIG. 5 is basically the same as the Prefix-SID Sub-TLV given in draft-ietf-isis-segment-routing-extensions, except that a new flag: Rainbow-Flag is added to the Flags. When the ABR advertises the prefix-sid of the (MT-default, prefix) to another area, the Rainbow flag can be set. After a node receives an advised prefix-sid of the (MT-default, prefix) with the Rainbow flag, the node decides whether the MRT-blue next hop of the (MT-blue, prefix) corresponding to the prefix is the advertising node and is the ABR. When the node decides that the MRT-blue next hop of the (MT-blue, prefix) corresponding to the prefix is the advertising node and is the ABR, it is considered that the MT-blue_SR outgoing label needs to be replaced with the MT-default SR outgoing label, otherwise it needs not to be replaced. Similarly, the outgoing label is replaced for the (MT-red, prefix) corresponding to the prefix.

FIG. 6 is a format diagram of an OSPF Prefix SID Sub-TLV according to an embodiment of the present disclosure. The OSPF Prefix SID Sub-TLV format shown in FIG. 6 is basically the same as Prefix SID Sub-TLV given in draft-ietf-ospf-segment-routing-extensions, except that a Rainbow-Flag flag bit is added to Flags, of which the description is the same as explained above.

First Embodiment

In the embodiment, a MRT path forwarding process in which the destination prefix is located inside the MRT Island will be described. FIG. 7 is a network topology diagram according to the first embodiment of the present disclosure. As shown in FIG. 7, OSPF is run in the network, and all nodes are in the same area. The segmentation routing function is enabled and the MRT profile defined in this patent is enabled in a corresponding OSPF instance. S acts as the source node to establish a MRT path to the prefix of a destination node D (such as a certain loopback route of D). The SPF primary path will be protected based on the MRT path. The process specifically includes the following steps.

In step S702, SR and the MRT profile defined in this patent are enabled in the OSPF instance on each node of the S, A, B, and D, and they form a MRT Island in the area. Since MRT SR-LSP based on multi-SRGB non-tunneling Option is specified as the forwarding mechanism in the MRT Profile, in addition to a MT-default_SRGB, a MT-red SRGB and a MT-blue SRGB are additionally allocated for each node. For example, on the node S, the three SRGBs are respectively identified as: MT_default_SRGB_S[ ], MT_red_SRGB_S[ ], and MT_blue_SRGB_S[ ].

On each node, a MT-default topology may be obtained based on the SPF algorithm in the area, and a MT-red topology and a MT-blue topology may be obtained based on the MRT algorithm. For example, on the node S, the MT-default path to the destination node D is S-D, the MT-red path is also S-D, and the MT-blue path is S-A-B-D.

On each node, a corresponding prefix entry is generated based on the topology. For example, on the node S, in the MT-default topology, the MT-default next hop on a route loopback0 to the destination node D is D, and the MT-blue path given in the MT-blue topology is selected to protect the MT-default next hop D. In this case, the corresponding MRT-FRR next hop will be copied to the next hop in the MT-blue, that is, A, which is called MRT-blue next hop. Assuming that the (MT-default, prefix-sid) corresponding to the loopback route of D is SID_D, and the outgoing label corresponding to the MT-default next hop D is MT_default_SRGB_D[SID_D], and the outgoing label corresponding to the MRT-blue next hop A is MT_blue_SRGB_A[SID_D], due to space limitations, only entries of several representative nodes will be listed as below.

Node S:
FTN for (MT-default, D-loopback0)
Primary NHLFE: the next hop is D, and the outgoing label is MT_default_SRGB_D[SID_D]
Standby NHLFE: the next hop is A, and the outgoing label is MT_blue_SRGB_A[SID_D]
ILM for (MT-default, D-loopback0)
the incoming label is MT_default_SRGB_S[SID_D]
Primary NHLFE: the next hop is D, and the outgoing label is MT_default_SRGB_D[SID_D]
Standby NHLFE: the next hop is A, and the outgoing label is MT_blue_SRGB_A[SID_D]
Node A:
ILM for (MT-blue, D-loopback0)
the incoming label is MT_blue_SRGB_A[SID_D]
NHLFE: the next hop is B, and the outgoing label is MT_blue_SRGB_B[SID_D]
Node B:
ILM for (MT-blue, D-loopback0)
the incoming label is MT_blue_SRGB_B[SID_D]
NHLFE: the next hop is D, and the outgoing label is MT_blue_SRGB_D[SID_D]
Node D:
ILM for (MT-blue, D-loopback0)
the incoming label is MT_blue_SRGB_D[SID_D]
NHLFE: None, which indicates that the SR-LSP has been terminated.

In step S704, for the packet sent to the destination D-loopback0, when the link S-D fails, the node S will act as the MRT ingress node to switch the traffic to the MRT-blue next hop A prepared in advance. That is, the packet will be forwarded along the MT-blue path S-A-B-D now.

If S receives a MT-default SR label packet, S forwards the packet based on the entry ILM for (MT-default, D-loopback0), and replaces the incoming label MT_default_SRGB_S[SID_D] with the outgoing label MT_blue_SRGB_A[SID_D]; if S receives an IP packet, S forwards the packet based on the entry FTN for (MT-default, D-loopback0), and directly push an outgoing label MT_blue_SRGB_A[SID_D] on the IP header.

In step S706, after receiving the packet, the node A matches the packet to the entry ILM for (MT-blue, D-loopback0) according to the top label MT_blue_SRGB_A[SID_D] of the packet, and in turn, replaces the top label MT_blue_SRGB_A[SID_D] of the packet with MT_blue_SRGB_B[SID_D] and sent the packet to B.

In step S708, after receiving the packet, the node B matches the packet to the entry ILM for (MT-blue, D-loopback0) according to the top label MT_blue_SRGB_B [SID_D] of the packet as, and in turn, exchanges the top label MT_blue_SRGB_B[SID_D] of the packet with MT_blue_SRGB_D[SID_D] and sent the packet to D.

In step S710, after receiving the packet, the node D matches the packet to the entry ILM for (MT-blue, D-loopback0) according to the top label MT_blue_SRGB_D [SID_D] of the packet, terminates the SR-LSP locally, strips the label, and forwards the packet according to the IP header. Since the IP header is D-loopback0, the packet is sent to the control plane.

According to the above embodiment, when the packet is forwarded along the MRT path, it is actually forwarded along the SR-LSP in the corresponding MRT topology.

Second Embodiment

Figure 8:
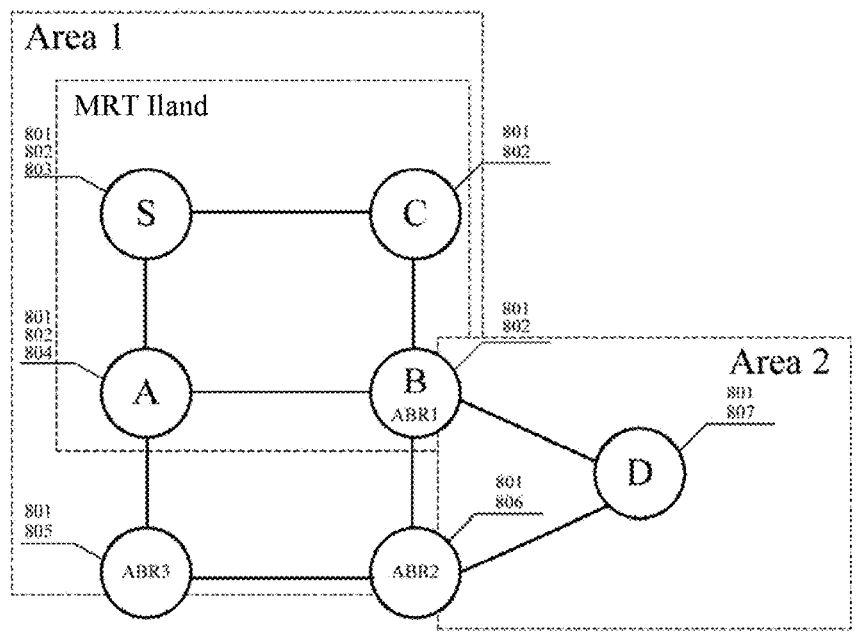
FIG. 8 is a network topology diagram according to a second embodiment of the present disclosure.

In the embodiment, a MRT path forwarding process in which the destination prefix is located outside the MRT Island will be described. FIG. 8 is a network topology diagram according to the second embodiment of the present disclosure. As shown in FIG. 8, OSPF is run in the network, including two areas. For all nodes, the segmentation routing function is enabled in a corresponding OSPF instance, and for S, A, B and C in area1, the MRT profile defined in the present disclosure is enabled. S acts as the source node to establish a MRT path to the prefix of a destination node D (such as a certain loopback route of D). The SPF primary path will be protected based on the MRT path. The process includes the following steps.

In step S802, for OSPF instances on all of the nodes in area1 and area2, SR is enabled. A MT-default_SRGB is allocated for each node.

In step S804, the MRT profile defined in this patent is enabled in the OSPF instance on each node of the S, A, B, and C in area1, and they form a MRT Island in the area1. Since MRT SR-LSP based on multi-SRGB non-tunneling Option is specified as the forwarding mechanism in the MRT Profile, a MT-red SRGB and a MT-blue_SRGB are additionally allocated for each node of the S, A, B, and C. For example, on the node S, the three SRGBs are respectively identified as: MT_default_SRGB_S[ ], MT_red_SRGB_S[ ], and MT_blue_SRGB S[ ].

On each node, a MT-default topology may be obtained based on the SPF algorithm in the area, and a MT-red topology and a MT-blue topology may be obtained based on the MRT algorithm. For example, on the node S, the MT-default path to the destination node B is S-C-B, the MT-red path is also S-C-B, and the MT-blue path is S-A-B.

On each node, a corresponding prefix entry is generated based on the topology. For example, on the node S, in the MT-default topology, the MT-default next hop on a route to prefix D-loopback0 is C (assuming that ABR1 in the area1 acts as the advising node of prefix D-loopback0, the MT-default path to the destination node ABR1 is used for determining the next hop). For prefix D-loopback0, if the Named Proxy-node method (see RFC7812) is used to calculate its MRT path, assuming that A in MRT Island acts as a blue proxy-node attachment router, B as a red proxy-node attachment router, and S as a GADAG Root, and S<<A<<B<<C<<S, the MRT-blue next hop to the prefix D-loopback0 in the MT-blue topology is A, and the MRT-red next hop to the prefix D-loopback0 in the MT-red topology is C. Apparently, here the MRT-blue next hop A given in the MT-blue topology is selected to protect the MT-default next hop C. Assuming that the (MT-default, prefix-sid) corresponding to the loopback route of D is SID_D, and the outgoing label corresponding to the MT-default next hop C is MT_default_SRGB_C[SID_D], and the outgoing label corresponding to the MRT-blue next hop A is MT_blue_SRGB_A[SID_D], again, only entries of several representative nodes will be listed as below.

Node S:
FTN for (MT-default, D-loopback0)
Primary NHLFE: the next hop is C and the outgoing label is MT_default_SRGB_C[SID_D]
Standby NHLFE: the next hop is A, and the outgoing label is MT_blue_SRGB_A[SID_D]
ILM for (MT-default, D-loopback0)
the incoming label is MT_default_SRGB_S[SID_D]
Primary NHLFE: the next hop is C, and the outgoing label is MT_default_SRGB_C[SID_D]
Standby NHLFE: the next hop is A, and the outgoing label is MT_blue_SRGB_A[SID_D]

Node A:
ILM for (MT-blue, D-loopback0)
the incoming label is MT_blue_SRGB_A[SID_D]
NHLFE: the next hop is LFIN:ABR3, and the outgoing label is MT_default_SRGB_ABR3[SID_D]

Node ABR3:
ILM for (MT-default, D-loopback0)
the incoming label is MT_default_SRGB_ABR3 [SID_D]
NHLFE: the next hop is ABR2, and the outgoing label is MT_default_SRGB_ABR2 [SID_D]

Node D:
ILM for (MT-default, D-loopback0)
the incoming label is MT_default_SRGB_D[SID_D]
NHLFE: None, which indicates that the SR-LSP has been terminated.

In step S806, for the packet sent to the destination D-loopback0, when the link S-C fails, the node S will act as the MRT ingress node to switch the traffic to the MRT-blue next hop A prepared in advance. That is, the packet will be forwarded along the MT-blue path S-A now.

If S receives a MT-default SR label packet, S forwards the packet based on the entry ILM for (MT-default, D-loopback0), and replaces the incoming label MT_default_SRGB_S[SID_D] with the outgoing label MT_blue_SRGB_A[SID_D]; if S receives an IP packet, S forwards the packet based on the entry FTN for (MT-default, D-loopback0), and directly push an outgoing label MT_blue_SRGB_A[SID_D] on the IP header.

In step S808, after receiving the packet, the node A matches the packet to the entry ILM for (MT-blue, D-loopback0) according to the top label MT_blue_SRGB_A [SID_D] of the packet, and in turn, replaces the top label MT_blue_SRGB_A[SID_D] of the packet with MT_default_SRGB_ABR3[SID_D] and sent the packet to ABR3.

Note: ABR3 is used as the LFIN node of A, so that A is selected as the blue proxy-node attachment router of prefix D-loopback0. Therefore, according to the forwarding rule defined in RFC7812, the packet will be forwarded directly from the node A to the LFIN node and enter the default topology. Therefore, in the NHLFE we give, the next hop points to ABR3, and the outgoing label is calculated based on MT_default_SRGB0.

In step S810, after receiving the packet, the node ABR3 matches the packet to the entry ILM for (MT-default, D-loopback0) according to the top label MT_default_SRGB_ABR3[SID_D] of the packet as, and in turn, exchanges the top label MT_default_SRGB_ABR3[SID_D] of the packet with MT_default_SRGB_ABR2[SID_D] and sent the packet to ABR2.

In step S812, after receiving the packet, the node ABR2 matches the packet to the entry ILM for (MT-default, D-loopback0) according to the top label MT_default_SRGB_ABR2[SID_D] of the packet, and in turn, exchanges the top label MT_default_SRGB_ABR2[SID_D] of the packet with MT_default_SRGB_D[SID_D] and sent the packet to D.

In step S814, after receiving the packet, the node D matches the packet to the entry ILM for (MT-default, D-loopback0) according to the top label MT_default_SRGB_D[SID_D] of the packet, terminates the SR-LSP locally, strips the label, and forwards the packet according to the IP header. Since the IP header is D-loopback0, the packet is sent to the control plane.

According to the above embodiment, it is known that when the packet is forwarded along the MRT path, it is actually forwarded along the SR-LSP in the corresponding MRT topology in the MRT Island. After leaving the MRT Island, it will be forwarded along the SR-LSP in the default topology. It conforms to the forwarding rules defined in RFC7812.

Third Embodiment

Figure 9:
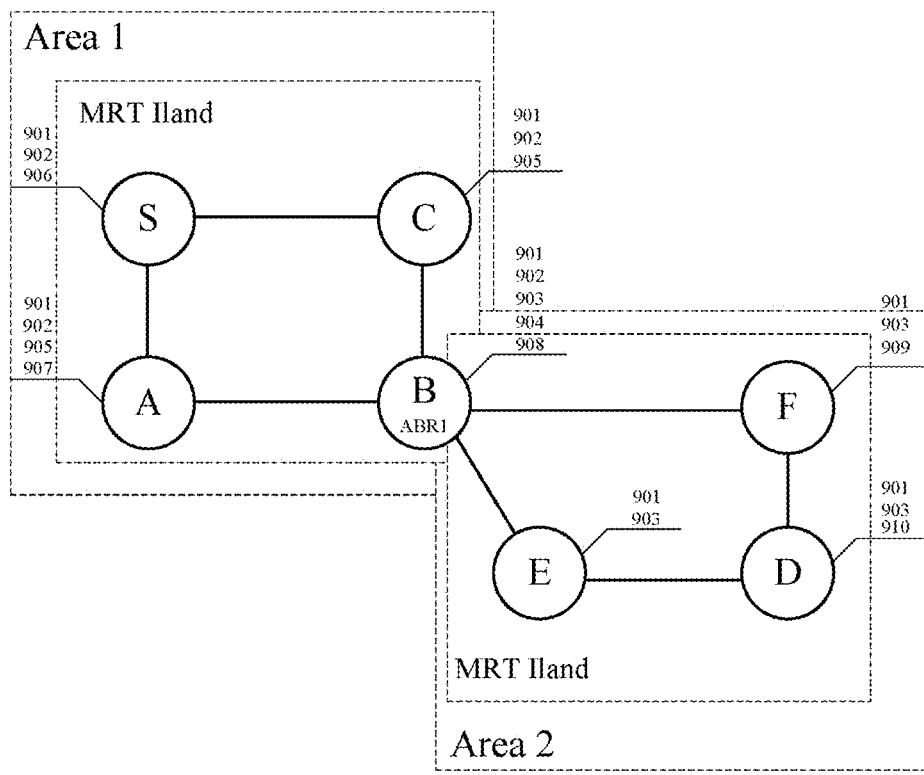
FIG. 9 is a network topology diagram according to a third embodiment of the present disclosure.

In the embodiment, a MRT path forwarding process in which the destination prefix is located outside the MRT Island will be described, in particular, how to implement the rainbow cross-area forwarding rule defined by RFC7812 based on SR-LSP. FIG. 9 is a network topology diagram according to the third embodiment of the present disclosure. As shown in FIG. 9, OSPF is run in the network, including two areas. For all nodes, the segmentation routing function is enabled in a corresponding OSPF instance, for S, A, B and C in area1, the MRT profile defined in the present patent is enabled, and for B, E, D and F in area2, the MRT profile defined in the present patent is also enabled. S acts as the source node to establish a MRT path to the prefix of a destination node D (such as a certain loopback route of D). The SPF primary path will be protected based on the MRT path. The process includes the following steps.

In step S902, for OSPF instances on all of the nodes in area1 and area2, SR is enabled. A MT-default_SRGB is allocated for each node.

In step S904, the MRT profile defined in this patent is enabled in the OSPF instance on each node of the S, A, B, and C in area1, and they form a MRT Island in the area1. Since MRT SR-LSP based on multi-SRGB non-tunneling Option is specified as the forwarding mechanism in the MRT Profile, a MT-red SRGB and a MT-blue_SRGB are additionally allocated for each node of the S, A, B, and C. For example, on the node S, the three SRGBs are respectively identified as: MT_default_SRGB_S[ ], MT_red_SRGB_S[ ], and MT_blue_SRGB S[ ].

On each node, a MT-default topology may be obtained based on the SPF algorithm in the area, and a MT-red topology and a MT-blue topology may be obtained based on the MRT algorithm. For example, on the node S, the MT-default path to the destination node B is S-C-B, the MT-red path is also S-C-B, and the MT-blue path is S-A-B.

On each node, a corresponding prefix entry is generated based on the topology. For example, on the node S, in the MT-default topology, the MT-default next hop on a route to prefix D-loopback0 is C (assuming that ABR1 in the area1 acts as the advising node of prefix D-loopback0, the MT-default path to the destination node ABR1 is used for determining the next hop). For prefix D-loopback0, assuming that B in MRT Island acts as both of a blue proxy-node attachment router, and a red proxy-node attachment router, and S as a GADAG Root, and S<<A<<B<<C<<S, the MRT-blue next hop to the prefix D-loopback0 in the MT-blue topology is A, and the MRT-red next hop to the prefix D-loopback0 in the MT-red topology is C. Apparently, here the MRT-blue next hop A given in the MT-blue topology is selected to protect the MT-default next hop C. Assuming that the (MT-default, prefix-sid) corresponding to the loopback route of D is SID_D, and the outgoing label corresponding to the MT-default next hop C is MT_default_SRGB_C [SID_D], and the outgoing label corresponding to the MRT-blue next hop A is MT_blue_SRGB_A[SID_D].

In step S906, similar to the first embodiment, the MRT profile defined in this patent is enabled in the OSPF instance on each node of the B, E, D, and F in area2, they also form an MRT Island in the area2, and generate corresponding MT-default topology and MT-red and MT-blue topologies in the area2. On each node in area2, entries in each topology to the prefix D-loopback2 are calculated similar to the steps described in the first embodiment. However, as we will see next, although an ILM entry in the MRT topology is generated for each node in area2, when the traffic is sent from the source node S across the areas to the destination node D, according to the forwarding rule defined in RFC7812, only ILM entries in the default topology generated in area2 can be hit. It is assumed that the next hop in the shortest path from B to D in the default topology is F.

In step S908, the node B functions as an ABR node. When the MT-default prefix D-loopback0 in the area2 is flooded to the neighbors in the area1, the corresponding prefix-sid is marked with a rainbow flag, and when the MT-default prefix D-loopback0 in the area2 is flooded to the neighbors in the area2, no flag will be marked.

In step S910, after receiving the advised prefix-sid of the MT-default prefix D-loopback0 with the rainbow flag, the neighbors A and C in the area1 of the B-node check whether the advising node of the prefix D-loopback0 and the next hop in the corresponding MRT topology is the node B, and if so, the corresponding MT-red (or blue) SR outgoing label should be set to the MT-default SR outgoing label. Specifically:

On the node A, the next hop in the MT-blue topology to prefix D-loopback0 is B, and the advertising node of prefix D-loopback0 is also B (since B is the ABR node). On the node A, the outgoing label of the NHLFE of the corresponding ILM for (MT-blue, D-loopback0) is set to MT_default_SRGB_B[SID_D]. In addition, the next hop in the MT-red topology on the node A to the prefix D-loopback0 is S, and the corresponding MT-red SR outgoing label does not need to be set to the MT-default SR outgoing label.

On the node C, the next hop in the MT-red topology to the prefix D-loopback0 is B, and the advertising node of the prefix D-loopback0 is also B (since B is the ABR node). On the node C, the outgoing label of the NHLFE of the corresponding ILM for (MT-red, D-loopback0) is set to MT_default_SRGB_B[SID_D]. In addition, the next hop in the MT-blue topology on the node A to the prefix D-loopback0 is S, and the corresponding MT-blue_SR outgoing label does not need to be set to the MT-default SR outgoing label.

Based on the above, entries of several representative nodes will be listed as below.

Node S:
FTN for (MT-default, D-loopback0)
Primary NHLFE: the next hop is C and the outgoing label is MT_default_SRGB_C[SID_D]

Standby NHLFE: the next hop is A, and the outgoing label is MT_blue_SRGB_A[SID_D]
ILM for (MT-default, D-loopback0)
the incoming label is MT_default_SRGB_S[SID_D]
Primary NHLFE: the next hop is C, and the outgoing label is MT_default_SRGB_C[SID_D]
Standby NHLFE: the next hop is A, and the outgoing label is MT_blue_SRGB_A[SID_D]
Node A:
ILM for (MT-blue, D-loopback0)
the incoming label is MT_blue_SRGB_A[SID_D]
NHLFE: the next hop is B, and the outgoing label is MT_default_SRGB_ABR3[SID_D]
Node B:
ILM for (MT-default, D-loopback0)
the incoming label is MT_default_SRGB_B [SID_D]
NHLFE: the next hop is F, and the outgoing label is MT_default_SRGB_F [SID_D]
Node F:
ILM for (MT-default, D-loopback0)
the incoming label is MT_default_SRGB_F[SID_D]
NHLFE: the next hop is D, and the outgoing label is MT_default_SRGB_D[SID_D]
Node D:
ILM for (MT-default, D-loopback0)
the incoming label is MT_default_SRGB_D[SID_D]
NHLFE: None, which indicates that the SR-LSP has been terminated.

In step S912, for the packet sent to the destination D-loopback0, when the link S-C fails, the node S will act as the MRT ingress node to switch the traffic to the MRT-blue next hop A prepared in advance. That is, the packet will be forwarded along the MT-blue path S-A-B now.

If S receives a MT-default SR label packet, S forwards the packet based on the entry ILM for (MT-default, D-loopback0), and replaces the incoming label MT_default_SRGB_S[SID_D] with the outgoing label MT_blue_SRGB_A[SID_D]; if S receives an IP packet, S forwards the packet based on the entry FTN for (MT-default, D-loopback0), and directly push an outgoing label MT_blue_SRGB_A[SID_D] on the IP header.

In step S914, after receiving the packet, the node A matches the packet to the entry ILM for (MT-blue, D-loopback0) according to the top label MT_blue_SRGB_A [SID_D] of the packet, and in turn, replaces the top label MT_blue_SRGB_A[SID_D] of the packet with MT-default_SRGB_B[SID_D] and sent the packet to B.

In step S916, after receiving the packet, the node B matches the packet to the entry ILM for (MT-blue, D-loopback0) according to the top label MT_default_SRGB_B [SID_D] of the packet as, and in turn, exchanges the top label MT_default_SRGB_B[SID_D] of the packet with MT_default_SRGB_F[SID_D] and sent the packet to F.

In step S918, after receiving the packet, the node F matches the packet to the entry ILM for (MT-blue, D-loopback0) according to the top label MT_default_SRGB_F [SID_D] of the packet, and in turn, exchanges the top label MT_default_SRGB_F[SID_D] of the packet with MT_default_SRGB_D[SID_D] and sent the packet to D.

In step S920, after receiving the packet, the node D matches the packet to the entry ILM for (MT-default, D-loopback0) according to the top label MT_default_SRGB_D[SID_D] of the packet, terminates the SR-LSP locally, strips the label, and forwards the packet according to the IP header. Since the IP header is D-loopback0, the packet is sent to the control plane.

According to the above embodiment, it is known that when the packet is forwarded along the MRT path in the area1, it is actually forwarded along the SR-LSP in the corresponding MRT topology in the MRT Island. After leaving the area1 and entering the area2, it will be forwarded along the SR-LSP in the default topology. It conforms to the forwarding rules defined in RFC7812.

Through the description of the above embodiments, those skilled in the art can clearly understand that the method according to the above embodiment can be implemented by means of software in combination with a necessary general hardware platform. However, it can also be implemented through hardware, but in many cases the former is a better implementation. Based on such understanding, the technical solution of the present disclosure, which is essential or contributes to the prior art, may be embodied in the form of a software product stored in a storage medium (such as a ROM/RAM, a disk, an optical disc). The storage medium includes a number of instructions for causing a terminal device (which may be a cell phone, a computer, a server, or a network device, etc.) to perform the methods described in various embodiments of the present disclosure.

In the embodiment, a device for forwarding a packet is also provided, which is configured to implement the above embodiments and preferred embodiments. The description that has been provided will not be repeated. As used below, the term "module" may implement a combination of software and/or hardware of a predetermined function. Although the devices described in the following embodiments are preferably implemented in software, hardware or a combination of software and hardware may also possible and may be contemplated.

Figure 10:
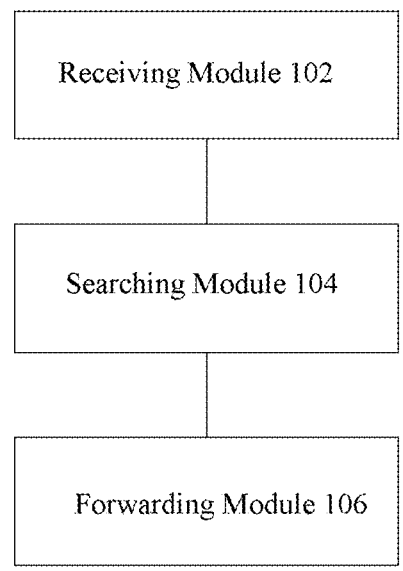
FIG. 10 is a block diagram of a device for forwarding a packet according to an embodiment of the present disclosure.

FIG. 10 is a block diagram of a device for forwarding a packet according to an embodiment of the present disclosure. As shown in FIG. 10, the device may be applied in a first node, which may be any node in the MRT Island, and the device includes a receiving module 102, a searching module 104 and a forwarding module 106, which will be described as below.

The receiving module 102 is configured to receive a packet to be forwarded, wherein a destination address of the packet is a second node. The searching module 104 is connected to the receiving module 102 and configured to search for a target topology corresponding to the packet in previously generated topologies, wherein the previously generated topologies include: a first topology and a second topology generated according to a maximum redundancy tree (MRT) algorithm, and a third topology generated according to a Shortest Path First (SPF) algorithm, and the first topology, the second topology and the third topology are different from one another. The forwarding module 106 is connected to the searching module 104, and configured to search for a next hop node for forwarding to the second node in the target topology, and forward the packet to the next hop node. In the embodiment, when forwarding the packet to the next hop node, the forwarding may be performed according to a predetermined forwarding mechanism which is a segmentation route forwarding mechanism based on a global block SRGB in a non-tunnel nesting manner for each topology and each segment route.

In an exemplary embodiment, the device further includes a first processing module configured to determine a protection route for protecting a route to the destination address in the third topology from a route to the destination address in the first topology and a route to the destination address in the second topology according to the MRT algorithm, and determine a topology corresponding to the protection route as a protection topology.

In an exemplary embodiment, the searching module 104 may search for a target topology corresponding to the packet in previously generated topologies by deciding whether a failure occurs in a link to the second node in the third topology; when deciding that there is no failure, determining the third topology as the target topology; and/or, when deciding there is a failure, determining the protection topology as the target topology.

In an exemplary embodiment, the device further includes a second processing module configured to, before receiving the packet to be forwarded, generate a first topology and a second topology according to the MRT algorithm, and generate the third topology according to the SPF algorithm.

In an exemplary embodiment, the second processing module may generate the first topology and the second topology according to the MRT algorithm, and generate the third topology according to the SPF algorithm by determining a MRT Island where the first node is located, wherein the MRT Island is formed at the same area or the same level as the first node through negotiation between the first node and other node at the same area or the same level as the first node after the segmentation route SR and the MRT profile are enabled in an Open shortest Path First (OSPF) instance or an Intermediate system to Intermediate system (ISIS) instance on the first node and said other node; generating the first topology and the second topology according to the MRT algorithm running on the MRT Island, and generating the third topology according to the SPF algorithm running in the area or at the level.

In an exemplary embodiment, the MRT profile specifies the predetermined forwarding mechanism, i.e., the segmentation route forwarding mechanism based on a global block SRGB in a non-tunnel nesting manner for each topology and each segment route.

In an exemplary embodiment, the device further includes a third processing module configured to perform at least one of: allocate a first segment route global block SRGB for the first topology, and flood the first SRGB inside the area or the level where the MRT Island is located; allocate a second segment route global block SRGB for the second topology, and flood the second SRGB inside the area or the level where the MRT Island is located; allocate a third segment route global block SRGB for the third topology, and flood the third SRGB inside the area or the level where the first node is located; receive segment route global blocks SRGBs for the previously generated topologies on other node, record the SRGBs for the previously generated topologies on said other node, and further advise the SRGBs for the previously generated topologies on said other node to a node other than said other node.

In an exemplary embodiment, the forwarding module 106 may forward the packet to the next hop node by determining an outgoing label of the first node; packing the outgoing label of the first node to the packet, and sending the packed packet to the next hop node.

In an exemplary embodiment, the forwarding module 106 may determine the outgoing label of the first node by deciding whether the next hop node is a node outside the MRT Island where the first node is located; when the deciding result is negative, determining an outgoing label of the first node for the corresponding target topology, wherein the outgoing label of the first node for the corresponding target topology is calculated by the first node based on a prefix segment index prefix-sid of the second node for the third topology and the SRGB of the next hop node for the corresponding target topology; and/or, when the deciding result is positive, determining an outgoing label of the first node for the corresponding target topology, wherein the outgoing label of the first node for the corresponding target topology is calculated by the first node based on a prefix segment index prefix-sid of the second node for the third topology and the SRGB of the next hop node for the corresponding third topology.

In an exemplary embodiment, the forwarding module 106 may determine the outgoing label of the first node by deciding whether the next hop node is an Area Border Router (ABR) or a Level Border Router (LBR) that requires the packet to be returned to the third topology; when the deciding result is negative, determining an outgoing label of the first node for the corresponding target topology, wherein the outgoing label of the first node for the corresponding target topology is calculated by the first node based on a prefix segment index prefix-sid of the second node for the third topology and the SRGB of the next hop node for the corresponding target topology; and/or, when the deciding result is positive, determining an outgoing label of the first node for the corresponding target topology, wherein the outgoing label of the first node for the corresponding target topology is calculated by the first node based on a prefix segment index prefix-sid of the second node for the third topology and the SRGB of the next hop node for the corresponding third topology.

In an exemplary embodiment, the forwarding module 106 may decide whether the next hop node is an ABR or a LBR that requires the packet to be returned to the third topology by deciding whether a prefix-sid corresponding to a destination prefix previously generated for the third topology, which was received from the next hop node, carries a predetermined flag, wherein the predetermined flag indicates that the destination prefix was revealed by the ABR or the LBR from outside the area or the level to the area or the level, and was marked with the predetermined flag by the ABR or the LBR, such that the packet to the destination prefix returns to the third topology after leaving the ABR or the LBR; when the deciding result is that the prefix-sid corresponding to the destination prefix previously generated for the third topology, which was received from the next hop node, carries the predetermined flag, and an advising node of the destination prefix in the third topology is the next hop node, determining that the next hop node is the ABR or the LBR that requires the packet to be returned to the third topology; and when the deciding result is that the prefix-sid corresponding to the destination prefix previously generated for the third topology, which was received from the next hop node, does not carry the predetermined flag, and the deciding result is that it carries the predetermined flag, but the advising node of the destination prefix in the third topology is not the next hop node, determining that the next hop node is not the ABR or the LBR that requires the packet to be returned to the third topology.

In an exemplary embodiment, when the first node is an ABR or an LBR, the third processing module is further configured to: when the destination prefix is advised to a neighbor in an area or level different from the area or level of the next hop node on the shortest path to the destination prefix, the prefix-sid corresponding to the destination prefix will carry the predetermined flag, and when the destination prefix is advised to a neighbor in an area or level the same as the area or level of the next hop node on the shortest path to the destination prefix, the prefix-sid corresponding to the destination prefix will not carry the predetermined flag.

In an exemplary embodiment, the forwarding module 106 may determine the outgoing label of the first node by: when the first node and the second node are the same node, the next hop node determined by the first node based on the target topology is the first node, and thus the first node does not have the outgoing label.

In an exemplary embodiment, the forwarding module 106 may pack the outgoing label of the first node into the packet by at least one of the following manners: when the packet type of the packet is an Internet Protocol (IP) packet, pushing the outgoing label of the first node on the IP header of the IP packet; and when the packet type of the packet is a segment routing SR label packet, replacing a top label of a label stack of the SR label packet with the outgoing label of the first node.

In an exemplary embodiment, the device further includes a third processing module configured to: when the first node and the second node are the same node, when the packet type of the packet is an Internet Protocol IP packet, send the packet to a control plane of the first node; and/or, when the packet type of the packet is a segment routing SR label packet, pop out the top label of the label stack of the SR label packet, and continue forwarding based on the lower label of the label stack or the IP header lookup table of the packet.

It should be noted that each of the foregoing modules may be implemented by software or hardware. For the latter, the foregoing may be implemented by, but not limited to, the foregoing modules are all located in the same processor; or, the foregoing modules are distributed among different processors in any form of combination.

An embodiment of the present disclosure also provides a storage medium. For example, in the embodiment, the storage medium may be configured to store program codes for performing the above steps.

For example, in the embodiment, the storage medium may include, but is not limited to, a USB flash drive, a Read-Only Memory (ROM), and a Random Access Memory (RAM). A variety of media that can store program codes, such as a hard disk, a disk, or an optical disk.

For example, in the embodiment, the processor performs the above steps according to the stored program codes in the storage medium.

For example, the specific examples in the embodiment may refer to the examples described in the above embodiments and the exemplary embodiments, details of which will not be repeated herein.

Compared with the related art, the method in the embodiment of the present disclosure fills the gap between the segmentation routing technology and the MRT technology, and provides valuable exploration for the future network evolution.

It will be apparent to those skilled in the art that the various modules or steps of the present disclosure described above can be implemented by a general-purpose computing device, which can be centralized on a single computing device or distributed across a network of multiple computing devices. Alternatively, they may be implemented by program codes executable by a computing device such that they may be stored in a storage device and executed by the computing device and, in some cases, may perform the steps shown or described in an order different from the order herein. Alternatively, they may be fabricated separately into individual integrated circuit modules, or a plurality of modules or steps thereof may be fabricated as a single integrated circuit module. Thus, the present disclosure is not limited to any specific combination of hardware and software.

The above description is only the preferred embodiments of the present disclosure, and is not intended to limit the present disclosure, and various modifications and changes can be made to the present disclosure. Any modifications, equivalent substitutions, improvements, etc., made within the spirit and scope of the present disclosure are intended to be included within the scope of the present disclosure.

INDUSTRIAL APPLICABILITY

The present disclosure is applicable to the field of communications for the objective of combining a segmented routing network with the MTR function.

What is claimed is:

1. A method for forwarding a packet, comprising:
receiving, by a first node, a packet to be forwarded, wherein a destination address of the packet is a second node;
searching, by the first node, for a target topology corresponding to the packet in previously generated topologies, wherein the previously generated topologies comprise: a first topology and a second topology generated according to a maximum redundancy tree MRT algorithm, and a third topology generated according to a Shortest Path First SPF algorithm, and the first topology, the second topology and the third topology are different from one another; and
searching, by the first node, for a next hop node for forwarding to the second node in the target topology, and forwarding the packet to the next hop node according to a predetermined forwarding mechanism, wherein the predetermined forwarding mechanism is a segment routing forwarding mechanism based on a segment routing global block SRGB in a non-tunnel nesting manner for each topology and each segment route,
wherein before receiving, by the first node, the packet to be forwarded, the method further comprises: generating, by the first node, the first topology and the second topology according to the MRT algorithm, and generating the third topology according to the SPF algorithm, and
wherein the step of generating, by the first node, the first topology and the second topology according to the MRT algorithm and generating the third topology according to the SPF algorithm comprises:
determining, by the first node, a MRT Island where the first node is located, wherein the MRT Island is formed at the same area or the same level as the first node through negotiation between the first node and other node at the same area or the same level as the first node after a segment routing SR and an MRT profile are enabled in an Open shortest Path First OSPF instance or an Intermediate system to Intermediate system ISIS instance on the first node and said other node; and
generating, by the first node the first topology and the second topology according to the MRT algorithm running on the MRT Island, and generating the third topology according to the SPF algorithm running in the area or at the level.

2. The method according to claim 1, further comprising:
determining, by the first node, a protection route for protecting a route to the destination address in the third topology from a route to the destination address in the first topology and a route to the destination address in the second topology according to the MRT algorithm, and determining a topology corresponding to the protection route as a protection topology.

3. The method according to claim 2, wherein searching, by the first node, for a target topology corresponding to the packet in previously generated topologies comprises:
    deciding, by the first node, whether a failure occurs in a link to the second node in the third topology;
    when deciding that there is no failure, determining, by the first node, the third topology as the target topology; and/or,
    when deciding there is a failure, determining, by the first node, the protection topology as the target topology.

4. The method according to claim 1, wherein the predetermined forwarding mechanism is specified in the MRT profile.

5. The method according to claim 1, further comprising at least one of:
    allocating, by the first node, a first segment routing global block SRGB for the first topology, and flooding the first SRGB inside the area or the level where the MRT Island is located;
    allocating, by the first node, a second segment routing global block SRGB for the second topology, and flooding the second SRGB inside the area or the level where the MRT Island is located;
    allocating, by the first node, a third segment routing global block SRGB for the third topology, and flooding the third SRGB inside the area or the level where the first node is located; and
    receiving, by the first node, segment routing global blocks SRGBs for the previously generated topologies on other node, recording the SRGBs for the previously generated topologies on said other node, and further advising the SRGBs for the previously generated topologies on said other node to a node other than said other node.

6. The method according to claim 1, wherein forwarding, by the first node, the packet to the next hop node comprises:
    determining, by the first node, an outgoing label of the first node; and
    packing, by the first node, the outgoing label of the first node to the packet, and sending the packed packet to the next hop node.

7. The method according to claim 6, wherein determining, by the first node, the outgoing label of the first node comprises:
    deciding, by the first node, whether the next hop node is a node outside an MRT Island where the first node is located;
    when the deciding result is negative, determining, by the first node, an outgoing label of the first node for the corresponding target topology, wherein the outgoing label of the first node for the corresponding target topology is calculated by the first node based on a prefix segment index prefix-sid of the second node for the third topology and the SRGB of the next hop node for the corresponding target topology; and/or,
    when the deciding result is positive, determining, by the first node, an outgoing label of the first node for the corresponding target topology, wherein the outgoing label of the first node for the corresponding target topology is calculated by the first node based on a prefix segment index prefix-sid of the second node for the third topology and the SRGB of the next hop node for a corresponding third topology.

8. The method according to claim 6, wherein determining, by the first node, the outgoing label of the first node comprises:
    deciding, by the first node, whether the next hop node is an Area Border Router ABR or a Level Border Router LBR that requires the packet to be returned to the third topology;
    when the deciding result is negative, determining, by the first node, an outgoing label of the first node for the corresponding target topology, wherein the outgoing label of the first node for the corresponding target topology is calculated by the first node based on a prefix segment index prefix-sid of the second node for the third topology and the SRGB of the next hop node for the corresponding target topology; and/or,
    when the deciding result is positive, determining, by the first node, an outgoing label of the first node for the corresponding target topology, wherein the outgoing label of the first node for the corresponding target topology is calculated by the first node based on a prefix segment index prefix-sid of the second node for the third topology and the SRGB of the next hop node for a corresponding third topology.

9. The method according to claim 8, wherein deciding, by the first node, whether the next hop node is an Area Border Router ABR or a Level Border Router LBR that requires the packet to be returned to the third topology comprises:
    deciding, by the first node, whether a prefix-sid corresponding to a destination prefix previously generated for the third topology, which was received from the next hop node, carries a predetermined flag, wherein the predetermined flag indicates that the destination prefix was revealed by the ABR or the LBR from outside the area or the level to the area or the level, and was marked with the predetermined flag by the ABR or the LBR, such that the packet to the destination prefix returns to the third topology after leaving the ABR or the LBR;
    when the deciding result is that the prefix-sid corresponding to the destination prefix previously generated for the third topology, which was received from the next hop node, carries the predetermined flag, and an advising node of the destination prefix in the third topology is the next hop node, determining that the next hop node is the ABR or the LBR that requires the packet to be returned to the third topology; and
    when the deciding result is that the prefix-sid corresponding to the destination prefix previously generated for the third topology, which was received from the next hop node, does not carry the predetermined flag, and the deciding result is that it carries the predetermined flag, but the advising node of the destination prefix in the third topology is not the next hop node, determining that the next hop node is not the ABR or the LBR that requires the packet to be returned to the third topology.

10. The method according to claim 9, wherein
    when the first node is an ABR or an LBR, when the first node advises the destination prefix to a neighbor in an area or level different from the area or level of the next hop node on the shortest path to the destination prefix, the prefix-sid corresponding to the destination prefix will carry the predetermined flag, and when the first node advises the destination prefix to a neighbor in an area or level the same as the area or level of the next hop node on the shortest path to the destination prefix, the prefix-sid corresponding to the destination prefix will not carry the predetermined flag.

11. The method according to claim 6, wherein determining, by the first node, an outgoing label of the first node comprises that:

when the first node and the second node are the same node, the next hop node determined by the first node based on the target topology is the first node, and the first node does not have the outgoing label.

12. The method according to claim 6, wherein packing, by the first node, the outgoing label of the first node to the packet, and sending the packed packet to the next hop node comprises at least one of:
   when a packet type of the packet is an Internet Protocol IP packet, pushing the outgoing label of the first node on an IP header of the IP packet; and
   when the packet type of the packet is a segment routing SR label packet, replacing a top label of a label stack of the SR label packet with the outgoing label of the first node.

13. The method according to claim 1, wherein when the first node and the second node are the same node, the method further comprises:
   when a packet type of the packet is an Internet Protocol IP packet, sending, by the first node, the packet to a control plane of the first node; and/or,
   when the packet type of the packet is a segment routing SR label packet, popping out, by the first node, a top label of a label stack of the SR label packet, and continuing forwarding based on the lower label of the label stack or a IP header lookup table of the packet.

14. A device for forwarding a packet, applied to a first node, comprising:
   a processor; and
   a memory for storing instructions executable by the processor;
   wherein the processor is configured to:
   receive a packet to be forwarded, wherein a destination address of the packet is a second node;
   search for a target topology corresponding to the packet in previously generated topologies, wherein the previously generated topologies comprise: a first topology and a second topology generated according to a maximum redundancy tree MRT algorithm, and a third topology generated according to a Shortest Path First SPF algorithm, and the first topology, the second topology and the third topology are different from one another; and
   search for a next hop node for forwarding to the second node in the target topology, and forward the packet to the next hop node according to a predetermined forwarding mechanism, wherein the predetermined forwarding mechanism is a segment routing forwarding mechanism based on a segment routing global block SRGB in a non-tunnel nesting manner for each topology and each segment route,
   wherein the processor is further configured to generate, by the first node, the first topology and the second topology according to the MRT algorithm and generate the third topology according to the SPF algorithm, and
   wherein the processor is further configured to:
   determine, by the first node, a MRT Island where the first node is located, wherein the MRT Island is formed at the same area or the same level as the first node through negotiation between the first node and other node at the same area or the same level as the first node after a segment routing SR and an MRT profile are enabled in an Open shortest Path First OSPF instance or an Intermediate system to Intermediate system ISIS instance on the first node and said other node; and
   generate, by the first node the first topology and the second topology according to the MRT algorithm running on the MRT Island, and generate the third topology according to the SPF algorithm running in the area or at the level.

15. A non-transitory computer-readable medium storing executable instructions for performing the method according to claim 1.

* * * * *